US006274666B1

United States Patent
Dougherty

(12) United States Patent
(10) Patent No.: US 6,274,666 B1
(45) Date of Patent: *Aug. 14, 2001

(54) ADHESIVE AND POLYMER FOR ADHESIVES

(75) Inventor: David J. Dougherty, Akron, OH (US)

(73) Assignee: Bridgestone/Firestone, Inc., Akron, OH (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/288,861

(22) Filed: Aug. 11, 1994

(51) Int. Cl.[7] ............................. C08L 53/02; C09J 153/02
(52) U.S. Cl. ............................. 524/505; 525/98; 525/314; 524/485
(58) Field of Search ................................. 524/271, 274, 524/505, 485; 525/98, 314

(56) References Cited

U.S. PATENT DOCUMENTS

| | | | |
|---|---|---|---|
| 3,700,748 | * 10/1972 | Winkler | 525/314 |
| 3,792,005 | 2/1974 | Harlan | 524/505 |
| 3,937,760 | 2/1976 | Cole et al. | 525/271 |
| 4,089,824 | * 5/1978 | Bronstert et al. | 524/274 |
| 4,286,077 | * 8/1981 | St. Clair et al. | 525/98 |
| 4,292,414 | 9/1981 | Saito et al. | 525/255 |
| 4,412,087 | 10/1983 | Trepka | 585/12 |
| 4,429,076 | 1/1984 | Saito et al. | 525/57 |
| 4,463,133 | 7/1984 | Takeuchi et al. | 525/99 |
| 4,526,577 | 7/1985 | Schmidt, Jr. et al. | 428/198 |
| 4,628,072 | 12/1986 | Shiraki et al. | 525/57 |
| 4,657,970 | 4/1987 | Shiraki et al. | 525/57 |
| 4,657,971 | 4/1987 | Shiraki et al. | 525/57 |
| 4,699,938 | * 10/1987 | Minamizaki et al. | 525/314 |
| 4,717,749 | * 1/1988 | Tang et al. | 524/274 |
| 4,792,584 | 12/1988 | Shiraki et al. | 524/274 |
| 4,987,194 | * 1/1991 | Maeda et al. | 525/314 |
| 5,071,920 | 12/1991 | Tung | 525/314 |
| 5,096,973 | * 3/1992 | Herrmann et al. | 525/314 |
| 5,143,968 | * 9/1992 | Diehl et al. | 525/314 |
| 5,147,939 | * 9/1992 | Hellermann et al. | 525/314 |
| 5,206,301 | * 4/1993 | Hattori et al. | 525/98 |
| 5,300,582 | * 4/1994 | Debier et al. | 525/314 |

FOREIGN PATENT DOCUMENTS

| | | | |
|---|---|---|---|
| 1336005 | 7/1973 | (GB) . | |
| 0127930 | * 10/1979 | (JP) | 525/98 |
| 0079035 | * 5/1983 | (JP) | 525/314 |

* cited by examiner

Primary Examiner—Peter Szekely
(74) Attorney, Agent, or Firm—David G. Burleson; Ann M. Skerry

(57) ABSTRACT

It has been discovered that block copolymers comprising at least two polymer blocks containing a vinyl aromatic hydrocarbon monomer contributed units and at least one polymer block conjugated diene monomer contributed units exhibit desirable adhesive properties. The vinyl aromatic hydrocarbon content [S] of the instant block copolymers is 25% to 60% by weight and the vinyl content of the conjugated diene portion [V] is 30% to 70%. The relationship between the vinyl aromatic hydrocarbon content [S] and the vinyl content of the conjugated diene portion [V] satisfies the formula:

$$75 \leq [S]+[V] \leq 100.$$

According to the instant invention, adhesive compositions may be prepared which contain about 10% to about 50% of the block copolymers, about 20% to about 80% of a compatible tackifying resin; about 10% to about 40% of a plasticizing oil; about 0.2% to about 2.5% of various stabilizers and 0% to about 10% of a compatible wax.

19 Claims, No Drawings

ADHESIVE AND POLYMER FOR ADHESIVES

FIELD OF THE INVENTION

This invention relates generally to polymers for use in adhesive compositions and to adhesive compositions containing such polymers.

BACKGROUND OF THE INVENTION

Adhesives have been used for various industrial purposes. Two major application processes are sprayable and fine-line application of hot melt adhesives. Of particular interest in such application methods are the viscosity of the hot melt adhesive at coating or spraying temperatures and cohesive strength of the adhesive itself. Other important properties include tack, adhesion to substrate and aging.

As base polymers of hot-melt adhesives, various polymers have been used such as polymers such as ethylene-vinyl acetate copolymers, block copolymers of conjugated dienes and vinyl aromatic hydrocarbons, ethylene-α-olefin copolymers, and polyester resins. Block copolymers are particularly preferred as adhesives because of possessing a relatively favorable balance between adhesive properties and creep resistance. Furthermore, butadiene-styrene block polymers are especially preferred as adhesives due to relatively low cost, excellent balancing of properties and good aging.

U.S. Pat. No. 4,792,584 (Shiraki et al.) discloses an adhesive composition containing a block copolymer containing at least one polymer block composed mainly of a vinyl aromatic hydrocarbon and at least one polymer block composed mainly of butadiene. The block copolymer is characterized by the fact that the vinyl aromatic hydrocarbon content [S] as measured by weight percent of the total block copolymer is 10 to 30% by weight of the block copolymer and the vinyl content [V] of the butadiene monomer contributed units in the block copolymer is 20 to 50%. To prepare an acceptable adhesive, the vinyl aromatic hydrocarbon content [S] and the vinyl content of the butadiene portion [V] must satisfy the following formula:

$$40 \leq [S]+[V] \leq 70.$$

According to this disclosure if the total vinyl aromatic hydrocarbon content and the vinyl content of the butadiene portion is outside the above range, the initial tack of the resultant adhesive is insufficient.

Applicants have discovered, contrary to the teachings of U.S. Pat. No. 4,792,584, that a block copolymer of high styrene and high vinyl content in the butadiene portion exhibits an excellent combination of low melt viscosity and high adhesive tensile while maintaining other adhesive properties. Block polymers containing styrene contents over 30% and a vinyl content in the butadiene portion which exceeds 35% are particularly preferred. These results are in complete opposition to the teachings of U.S. Pat. No. 4,792,584.

It is therefore an object of the present invention to provide block copolymers exhibiting excellent adhesive tensile strength and low melt viscosity while maintaining other desirable physical and adhesive properties. It is a further object of the present invention to provide adhesive compositions containing block copolymers having high adhesive tensile strength and low melt viscosity.

SUMMARY OF THE INVENTION

It has been discovered that block copolymers containing at least two polymer blocks formed from a vinyl aromatic hydrocarbon monomers and at least one polymer block compound formed from conjugated diene monomers exhibit very desirable properties when utilized in adhesive compositions. The vinyl aromatic hydrocarbon content [S] of the instant block copolymers is 25% to 60% by weight and the 1,2-vinyl content of the conjugated diene portion [V] is 30% to 70%. The block copolymers possess a vinyl aromatic hydrocarbon content [S] and a vinyl (1,2-microstructure) content of the conjugated diene portion [V] satisfying the formula:

$$75 \leq [S]+[V] \leq 100.$$

The "vinyl aromatic hydrocarbon content [S]" is expressed in percent by weight of the vinyl aromatic hydrocarbon contributed units per weight of the block copolymer. The "vinyl content [V]" of the conjugated diene portion is the percentage of conjugated diene monomers units polymerized having a vinyl (1,2-microstructure) structure of the total diene monomer contributed units in the block copolymer. The diene units polymerize in either the form of 1,4-microstructure or 1,2-microstructure. The vinyl or 1,2-microstructure percentage can be calculated by determining the vinyl content in the conjugated diene portion using an infrared spectrometer, NMR apparatus or the like.

The preferred vinyl aromatic hydrocarbon monomer is styrene and the preferred conjugated diene monomer is butadiene. The preferred relationship between the vinyl aromatic hydrocarbon content [S] and the vinyl content [V] of the conjugated diene portion satisfies the formula:

$$90 \leq [S]+[V] < 100$$

According to the instant invention, adhesive compositions exhibiting superior adhesive tensile strength may be prepared containing about 10% to about 50% of the instant thermoplastic elastomers, about 20% to about 80% of a compatible tackifying resin; about 10% to about 40% of a plasticizing oil; about 0.2% to about 2.5% of various stabilizers and 0% to about 10% of a compatible wax.

DETAILED DESCRIPTION OF THE PREFERRED EMBODIMENTS

The block copolymers prepared in accordance with this invention are prepared by the copolymerization of conjugated diene monomers and vinyl substituted aromatic hydrocarbons monomers. Polymerizable 1,3-diene monomers that can be employed in the production of the copolymers of the present invention are 1,3-butadiene, isoprene, 2,3-dimethyl-1,3-butadiene, 1,3-pentadiene and the like mixtures thereof, preferably butadiene and isoprene. Exemplary vinyl substituted aromatic hydrocarbons, hereinafter vinyl aromatic hydrocarbons, include: styrene, alpha-methylstyrene; 1-vinylnaphthalene; 2-vinyl-naphthalene; 1-alpha-methylvinylnaphthalene; 2-alpha-methyl-vinylnaphthalene; and mixtures of these as well as alkyl, cycloalkyl, aryl, alkaryl and aralkyl derivatives thereof in which the total number of carbon atoms in the combined hydrocarbon is generally not greater than 12. Examples of these latter compounds include: 4-methylstyrene; vinyl toluene; 3,5-diethylstyrene; 2-ethyl-4-benzylstyrene; 4-phenylstyrene; 4-para-tolylstyrene; and 4,5-dimethyl-1-vinylnaphthalene. Occasionally, di- and tri-vinyl aromatic hydrocarbons are used in small amounts in addition with mono-vinyl aromatic hydrocarbons. The preferred vinyl aromatic hydrocarbon is styrene.

Any anionic initiator that is known in the art as useful in the copolymerization of diene monomers with vinyl aromatic hydrocarbons can be employed in the process of the instant invention. Exemplary organo-lithium catalysts include lithium compounds having the formula $R(Li)_x$, wherein R represents a hydrocarbyl radical of 1 to 20 preferably 2 to 8 carbon atoms per R group and x is an integer from 1 to 4. Typical R groups include aliphatic radicals and cycloaliphatic radicals, such as alkyl, cycloalkyl, cycloalkylalkyl, alkylcycloalkyl, aryl and alkylaryl radicals. Specific examples of R groups for substitution in the above formulas include primary, secondary and tertiary groups such as methyl, ethyl, n-propyl, isopropyl, n-butyl, isobutyl, t-butyl, n-amyl, isoamyl, n-hexyl, n-octyl, n-decyl, cyclopentyl-methyl, cyclohexyl-ethyl, cyclopentyl-ethyl, methylcyclopentylethyl, cyclopentyl, dimethylcyclopentyl, ethylcyclopentyl, methylcyclohexyl, dimethylcyclohexyl, ethylcyclohexyl, isopropylcyclohexyl, and the like. These anionic initiators are useful in amounts ranging from 0.01 to 50 millimoles per hundred grams of monomer charge.

Specific example of other suitable lithium catalysts include: p-tolyllithium, 4-phenylbutyl-lithium, 4-butylcyclohexyllithium, 4-cyclohexylbutyl-lithium, lithium dialkyl amines, lithium dialkyl phosphines, lithium alkyl aryl phosphine, lithium diaryl phosphines and the like.

The block polymers of the instant invention must include at least two vinyl aromatic hydrocarbon blocks and at least one butadiene block. The resulting structure of the polymers may be linear, branched or coupled. Typical examples of the various structures of the block useful in the present invention are as follows:

| | |
|---|---|
| $(B-S)_{n+1}$ | linear |
| $S-(B-S)_n$ | linear |
| $B-(S-B)_{n+1}$ | linear |
| $(S-B)_nX$ | coupled |
| $(S-B-S)_nX$ | coupled |
| $(B-S-B)_nX$ | coupled |
| $(S-B-S-B)_nX$ | coupled |
| $(B-S-B-S)_nX$ | coupled |
| $(S-B-S-B-S)_nX$ | coupled |
| $[B(S)-B-B-B(S)-B-B(S)-B]_n$ | branched | wherein S is a polymer block primarily containing vinyl aromatic hydrocarbon monomer contributed units, B is a polymer block primarily containing conjugated diene monomer contributed units, X is a residual group of a polyfunctional coupling agent having two or more functional groups, and n is an integer of one or more. Any known coupling agent may be used. Silicon tetrachloride is the preferred coupling agent. The rubbery diene block portion of the block polymer may contain up to 20% by weight of vinyl aromatic hydrocarbon monomer contributed units in order to adjust the glass transition temperature ($T_g$) or the solubility parameter of the resultant block polymer.

Block polymer end blocks formed from vinyl aromatic hydrocarbon contributed units maximize adhesive tensile and creep resistance in the resultant block polymer. However, high tack values are obtained in block polymers having at least one diene end block or a prevalent diene copolymer end block.

A 1,2-microstructure controlling agent or randomizing modifier is preferably used to control the 1,2-microstructure in the diene contributed units and to randomize the amount of vinyl aromatic monomers, such as styrene, incorporated with the diene monomer, such as butadiene, in the rubbery phase. Suitable modifiers include, but are not limited to, tetramethylenediamine, oligomeric oxolanyl propanes, 2,2-bis-(4-methyl dioxane), tetrahydrofuran, bistetrahydrofuryl propane and the like. One or more randomizing modifiers can be used. The amount of the modifier to the weight of the monomers can vary during each cycle of monomer charge in a range from a minimum as low as 0 to a maximum as great as 400 millimoles, preferably 0.01 to 300.0 millimoles, of modifier per hundred grams of monomer currently being charged into the reactor. As the modifier charge increases, the percentage of 1,2-microstructure increases in the diene monomer contributed units.

The conjugated diene portion of the block copolymer may be partially hydrogenated provided that the percent of 1,2-microstructure present in the conjugated diene remains between 30 and 70 percent. Hydrogenation can be performed by any process standard in the art such as in U.S. Pat. No. 3,673,281 to Bronstart et al., and U.S. Pat. No. 3,113,986 to Breslow et al., which are herein incorporated by reference.

The block copolymers of the present invention may be produced by any preparation method known in the art, provided that the copolymer obtained exhibits the physical characteristics of the copolymer listed above. Representative preparation methods are described below. Namely, the starting polymer block can be obtained by the homopolymerization of monomeric diene or the copolymerization with a predetermined ratio of vinyl aromatic monomer in an inert solvent such as an aliphatic alkane such as hexane by using a lithium initiation as the polymerization catalyst. A polar organic compound such as ether, polyether, tertiary amine, polyamine, thioether and hexamethylphosphortriamide may be used to control the vinyl content in the diene contributed monomer units. The vinyl content can be controlled by the amount added of the polar organic compound, and by the polymerization temperature. The remaining blocks are then prepared by subsequent charging of selected monomers.

The block copolymer prepared according to this invention is preferably incorporated into an adhesive composition. The adhesive composition will contain about 10% to about 50% by weight of the block copolymer, wherein the block copolymer contains approximately 25% to about 60% by weight preferably 35 to 50% by weight of vinyl aromatic monomer contributed units and contains about 30% to about 70%, preferably 40 to 60% vinyl content in the diene monomer contributed units; about 20% to about 80% by weight of a compatible tackifying resin; about 10% to about 40% by weight of a plasticizing oil; about 0.2% to about 2.5% by weight of a stabilizer and 0 to 10% by weight of a compatible wax. In the preferred mode the adhesive composition will contain 32 parts of a thermoplastic elastomer, wherein the thermoplastic elastomer contains 40 to 50% styrene, most preferably 44% by weight of styrene units contributed, and 40 to 50% vinyl content in the diene monomer contributed units, preferably 46% vinyl; 47.5 parts of a compatible tackifying resin; 20 parts of a plasticizing oil and 0.5 parts of a stabilizer. The resulting adhesive composition exhibits unusually high adhesive tensile and unusually low adhesive viscosity while maintaining other properties such as tack, quick stick and pull strength.

The tackifying resins useful in the adhesive compositions can be hydrocarbon resins, synthetic polyterpenes, rosin esters, natural terpenes and the like. It is common practice in the adhesive industry to include specific tackifying resins into thermoplastic elastomer compositions to obtain optimum adhesive properties. More particularly, the useful tackifying resins include any compatible resins or mixtures thereof such as (1) natural and modified rosins such, for example, as gum rosin, wood rosin, tall oil rosin, distilled rosin, hydrogenated rosin, dimerized rosin, and polymerized rosin; (2) glycerol and pentaerythritol esters of natural and modified rosins, such as, for example, the glycerol ester of pale wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natural terpenes, e.g. styrene/terpene and alpha methyl styrene/terpene; (4)polyterpene resins having a softening point, as determined by ASTM method E28-58T, of from about 80 to 150 C; the latter polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof such, for example, as the resin product resulting from the condensation, in an acidic medium, of a bicyclic terpene and a phenol; (6) aliphatic petroleum hydrocarbon resins having a Ring and Ball softening point of from about 70 to 135° C.; the latter resins resulting from the polymerization of monomers consisting primarily of olefins and diolefins; also included are the hydrogenated aliphatic petroleum hydrocarbon resins; (7) aromatic petroleum hydrocarbon resins and the hydrogenated derivatives thereof; and (8) alicyclic petroleum hydrocarbon resins and the hydrogenated derivatives thereof. Mixtures of two or more of the tackifying resins disclosed above may also be used.

Various plasticizing or extending oils are also present in the adhesive composition in amount of 10% to about 40%, preferably 15 to 30%, most preferably 20%. These oils provide wetting action and/or viscosity control. The above broadly includes not only the usual plasticizing oils but also contemplates the use of olefin oligomers and low molecular weight polymers as well as vegetable and animal oil and their derivatives. The petroleum derived oils which may be employed are relatively high boiling materials containing only a minor proportion of aromatic hydrocarbons (preferably less than 30% and, more preferably, less than 15% by weight of the oil). Alternatively, the oil may be polypropylene, polybutene, hydrogenated polyisoprene, hydrogenated polybutadiene, or the like having average molecular weights between about 350 and about 10,000. Vegetable and animal oils include glyceryl esters of the usual fatty acids and polymerization products thereof.

The adhesive compositions of this invention may be incorporated with phenolic stabilizers, phosphorous-containing stabilizers, sulfur-containing stabilizers and amine series stabilizers in order to impart thereto thermal stability at high temperatures. Particularly preferable stabilizers include the 1 phenolic compounds of the general formulas [I] and [II] of U.S. Pat. No. 4,792,584 which is herein incorporated by reference.

Specific examples of the phosphorous-containing stabilizer include tris(nonylphenyl)phosphite, tris(2,4-di-tert-butylphenyl)phosphite, 4,4-butylidene-bis(3-methyl-6-tert-butylphenyl)-di-(tridecyl)-phosphite, tetrakis(2,4-di-tert-butylphenyl)-4,4'-biphenylene-diphosphinate and cyclic neopentanetetraylbis-(2,4-di-tert-butylphenyl)phosphite.

Specific examples of sulfur-containing stabilizers include dilauryl-3,3'-thiodipropionic acid esters, dimyristyl-3,3'thiodipropionic acid esters, distearyl-3,3'-thiodipropionic acid esters, laurylstearyl-3,3'-thiodipropionic acid esters, and ditridecyl-3,3'-thiodipropionic acid esters.

Examples of amine series stabilizers include diarylamine type stabilizers such as diphenylamine, N-phenyl-o-naphthylamine, N-phenyl-B-naphthylamine, butylated diphenylamine, styrenated diphenylamine, octylated diphenylamine, nonylated diphenylamine, and the like; alkylarylamine type stabilizers such as N-cyclohexylaniline, N-methylaniline, N-isopropylaniline, N-1,3-dimethylbutylaniline, N-(2-ethylhexyl)aniline, and the like; N,N'-diaryl-p-phenylenediamine type stabilizers such as N,N'-diphenyl-p-phenylenediamine, N,N'-diorthotolyl-p-phenylene-diamine, N,N'-bis(2,4-xylyl)-p-phenylenediamine, N,N'-bistolyl-p-phenylenediamine, N,N'-ditolyl-p-phenylenediamine, N-tolyl-N'-xylyl-p-phenylenediamine, N,N'-dixylyl-p-phenylenediamine, N,N'-bis-8-naphthyl-p-phenylenediamine, ad the like; N-aryl-p-phenylenediamine type stabilizers such as N-phenyl-p-phenylene-diamine, N-tolyl-p-phenylenediamine, N-xylyl-p-phenylenediamine, and the like; N-aryl-N'-alkyl-p-phenylenediamine type stabilizers such as N-phenyl-N'-isopropyl-p-phenylenediamine, N-phenyl-N'-isobutyl-p-phenylenediamine, N-phenyl-N'-(1,3-dimethylbutyl)-p-phenylenediamine, N-phenyl-N'-cyclohexyl-p-phenylenediamine, N-phenyl-N'-octyl-p-phenylenediamine, and the like; N,N'-dialkyl-p-phenylenediamine type stabilizers such as N,N'-bis(1-methyl-heptyl)-p-phenylene diamine, N,N'-bis-(1,4-dimethylpentyl)-p-phenylenediamine, N,N'-bis-(1-ethyl-3-methylpentyl)-p-phenylene-diamine, and the like; quinoline derivative type stabilizers such as 2,24-trimethyl-1,2-dihydroquinoline, 2,24-trimethyl-1,2-dihydroquinoline polymers, 6-ethoxy-2,24-trimethyl-1,2-dihydroquinoline, and the like; and condensation product type stabilizers such as dehydrating-condensation products of aldol-α-naphthylamine or diphenylamine and acetone, and the like. These stabilizers may be used alone or in proper combination of two or more stabilizers.

Various petroleum derived waxes may also be used in amounts less than about 10% by weight of the composition in order to impart fluidity in the molten condition of the adhesive and flexibility to the set adhesive, and to serve as a wetting agent for bonding cellulosic fibers. The term "petroleum derived wax" includes both paraffin and microcrystalline waxes having melting points within the range of 130–225° F. as well as synthetic waxes such as low molecular weight polyethylene or Fisher-Tropsch waxes.

The adhesive compositions are prepared by blending the components in the melt at a temperature of about 130–200° C. until a homogenous blend is obtained, approximately two hours. Various methods of blending are known in the art and any method that produces a homogenous blend is satisfactory.

The following examples are presented for purposes of illustration only and are not to be construed in a limiting sense. All percentages are by weight unless otherwise specified.

COMPARATIVE EXAMPLE A

An adhesive composition was prepared containing Stereon 840 as the thermoplastic elastomer. Stereon 840 is the trademark of a block copolymer containing styrene and butadiene. Stereon 840 is distributed commercially by the Firestone Synthetic Rubber & Latex Co. and is disclosed in U.S. Pat. No. 4,526,577. Stereon 840 contains 44% styrene, 10% vinyl microstructure and has a GPC molecular weight of 84,000.

Table I describes the thermoplastic elastomers of styrene and modified butadiene that were used in Examples 1 to 6.

TABLE I

| Example | % Styrene | % 1,2-microstructure | GPC Mol. Wt. |
|---------|-----------|----------------------|--------------|
| 1 | 43 | 35 | 84,000 |
| 2 | 44 | 39 | 84,000 |
| 3 | 43 | 43 | 87,000 |
| 4 | 42 | 45 | 81,000 |
| 5 | 45 | 49 | 83,000 |
| 6 | 48 | 58 | 91,000 |

The thermoplastic elastomers disclosed in Comparative Example 1 and Examples 1 to 6 were incorporated into adhesive compositions. Each adhesive composition contained the following components:

| | |
|---|---|
| Thermoplastic Elastomer | 32 parts |
| Modified Terpene Resin | 47.5 parts |
| Naphthenic Oil | 20 parts |
| Irganox 1010 | 0.5 parts |

After the seven adhesive compositions were prepared they were evaluated using the following standard tests:

Quick Stick, 90° Angle

Quick Stick 90° is that property of a pressure-sensitive tape which causes the tape to adhere to a surface instantly, using no external pressure to secure more thorough contact. It is measured as the force in ounces per inch resisting peeling of a tape at a 90° angle from a standard surface upon which it has been applied under no other pressure than the weight of the tape itself. Quick Stick is a measure of a tape's ability to adhere with minimum pressure.

Peel Adhesion for Single Coated Tapes, 180° Angle

Peel Adhesion for Single Coated Tapes, 180° Angle, refers to the force measured in ounces per inch required to remove a pressure-sensitive tape from a panel or its own backing at a specified angle and speed. The tape is applied to a standard test panel, or a test panel covered with the tape under test, using different pressures to make the contact. Peel adhesion is one method of determining the adhesive strength of a pressure-sensitive tape.

Shear Adhesion Failure Temperature (SAFT) (Holding Power), 178° Angle

SAFT is a measure of the ability of a pressure-sensitive tape to withstand an elevated temperature rising at 40° F. per hour under a constant force which pulls the pressure-sensitive tape from a standard flat surface in a direction essentially parallel to the surface to which it has been affixed with a definite pressure. It is measured in terms of the temperature in F required to pull a standard area of tape from a test panel under a standard load, or in terms of a distance the tape has been displaced in a given time on a test panel under a standard load. Shear Adhesion Failure Temperature is a method of determining the resistance to shear of a tape under constant load under a rising temperature.

Polyken Probe Tack Test

This test measures the tackiness of pressure-sensitive adhesives and other materials. The Polyken Probe Tack Testing Machine provides a means of bringing the tip of a flat probe into contact with these materials at controlled rates, contact pressures, dwell times and subsequently measuring in grams per square centimeter the force required to break the adhesive bond. The probe used had the 280 grit abrasive finish as recommended by the manufacturer, TMI-Testing Machines, Inc., for testing pressure-sensitive adhesives. The contact pressure was 100 gms/cm2, the dwell time was 1 sec., and the rate of test was 1 cm/sec.

Brookfield Thermosel Viscosity

This test measures the viscosity of the adhesive compound at 300 F, 325 F and 350 F using spindle No. 27. The revolutions-per-minute (rpm) are maintained to keep a mid-range reading. The adhesive compound is dissolved in 100 parts of toluene for this test.

Adhesive Tensile

The adhesive tensile of the adhesive compound is measured by casting a dumbell 0.5 inch by 0.125 inch cross-sectional area and pulling on an Instron at a rate of 12 inches per minute. This test is conducted at room temperature.

The seven adhesive compounds, each adhesive compound containing either one of the elastomers of Examples 1 to 6 or the elastomer of Comparative Example A, were tested using the testing procedures outlined above. The results of these tests are summarized in Tables II and III.

TABLE II

Table of Adhesive Properties

| Polymer | Quick Stick (oz/inch) | 180 Peel St, Steel (oz/inch) | 180 Peel Polyethylene (oz/inch) | SAFT (° F.) |
|---|---|---|---|---|
| Comparative Example A | 62 | 66 | 47 | 154 |
| Example 1 | 67 | 67 | 45 | 158 |
| Example 2 | 66 | 66 | 45 | 155 |
| Example 3 | 56 | 90 | 32 | 154 |
| Example 4 | 51 | 90 | 40 | 158 |
| Example 5 | 56 | 101 | 21 | 162 |
| Example 6 | 16 | 82 | 5 | 167 |

TABLE III

Table of Adhesive Properites

| Polymer | Adhesive Viscosity (cps) | | | Polyken Probe Tack Test (g/cm$^2$) | Adhesive Tensile (psi) |
|---|---|---|---|---|---|
| | 300° F. | 325° F. | 350° F. | | |
| Comparative Example A | 14425 | 8900 | 5950 | 930 | 60 |
| Example 1 | 9920 | 5600 | 3480 | 692 | 163 |
| Example 2 | 8788 | 5212 | 3265 | 734 | 164 |
| Example 3 | 7138 | 4338 | 2875 | 764 | 158 |
| Example 4 | 7125 | 4135 | 2610 | 890 | 175 |
| Example 5 | 6150 | 3675 | 2410 | 982 | 214 |
| Example 6 | 4890 | 2760 | 1850 | 250 | 192 |

As stated in Table III, the adhesive tensile of the adhesive compound containing Stereon 840 (Comparative Example A) was 60 psi. This value was considerably lower than the adhesive tensile values for those adhesive compounds containing the thermoplastic elastomers of the instant invention (Examples 1 to 6).

We claim:

1. An adhesive composition comprising:
   (a) 10% to 50% of a linear block copolymer, wherein said block copolymer comprises at least two polymer blocks comprising a vinyl aromatic hydrocarbon and at least one polymer block comprising a conjugated diene, and comprises:
     (i) a vinyl aromatic hydrocarbon content [S] of 40 to 50% by weight;

(ii) a vinyl content of the conjugated diene portion [V] of 30% to 70%; and (iii) the relationship between said vinyl aromatic hydrocarbon content [S] and said 1,2-vinyl content of the conjugated diene portion [V] satisfies the formula:

$$75 \leq [S]+[V] \leq 100;$$

(b) 20% to 80% of a compatible tackifying resin;
(c) 10% to 40% of a plasticizing oil;
(d) 0.2% to 2.5% of a stabilizer; and
(e) 0 to 10% of a compatible wax.

2. The adhesive composition according to claim 1 wherein said vinyl aromatic hydrocarbon is styrene.

3. The adhesive composition according to claim 1 wherein the vinyl content of the conjugated diene portion [V] is 40 to 50%.

4. The adhesive composition according to claim 1 wherein the relationship between said vinyl aromatic hydrocarbon content [S] and said vinyl content of the conjugated diene portion [V] satisfies the formula:

$$90 \leq [S]+[V] \leq 100.$$

5. The adhesive composition according to claim 1 wherein said conjugated diene comprises butadiene.

6. The adhesive composition according to claim 1 wherein said resin is a modified terpene resin.

7. The adhesive composition according to claim 1 wherein said oil is a naphthenic oil.

8. The adhesive composition according to claim 1, wherein the block copolymer is branched.

9. An adhesive composition comprising:

(a) 10% to 50% of a block linear copolymer, wherein said block copolymer comprises at least two polymer blocks comprising a vinyl aromatic hydrocarbon and at least one polymer block comprising a conjugated diene, and comprises:

(i) a vinyl aromatic hydrocarbon content [S] of 40% to 60% by weight;

(ii) a vinyl content of the conjugated diene portion [V] of 30% to 70%; and (iii) the relationship between said vinyl aromatic hydrocarbon content [S] and said 1,2-vinyl content of the conjugated diene portion [V] satisfies the formula:

$$75 \leq [S]+[V] \leq 100;$$

(b) 20% to 80% of a compatible tackifying resin;
(c) 10% to 40% of a plasticizing oil;
(d) 0.2% to 2.5% of a stabilizer; and
(e) 0 to 10% of a compatible wax.

10. The adhesive composition according to claim 9 wherein said vinyl aromatic hydrocarbon is styrene.

11. The adhesive composition according to claim 9 wherein the vinyl aromatic hydrocarbon content [S] is 40 to 50% by weight and the vinyl content of the conjugated diene portion [V] is 40 to 50%.

12. The adhesive composition according to claim 9 wherein the relationship between said vinyl aromatic hydrocarbon content [S] and said vinyl content of the conjugated diene portion [V] satisfies the formula:

$$90 \leq [S]+[V] \leq 100.$$

13. The adhesive composition according to claim 9 wherein said conjugated diene comprises butadiene.

14. The adhesive composition according to claim 9 wherein said resin is a modified terpene resin.

15. The adhesive composition according to claim 9 wherein said oil is a naphthenic oil.

16. The adhesive composition of claim 1, wherein the vinyl content of the conjugated diene portion [V] is between 40 and 60% by weight.

17. The adhesive composition of claim 9, wherein the vinyl content of the conjugated diene portion is between 40 and 60% by weight.

18. The adhesive composition of claim 9 wherein said linear block copolymer includes two conjugated diene end blocks.

19. The adhesive composition of claim 9 wherein the vinyl aromatic hydrocarbon content (S) is between 42% to 60% by weight.

* * * * *